April 8, 1924.

J. I. MICHEL

NUT LOCK

Filed June 12, 1922

1,490,017

J. I. Michel
INVENTOR

BY Victor J. Evans
ATTORNEY

H. A. LaClair
WITNESS:

Patented Apr. 8, 1924.

1,490,017

UNITED STATES PATENT OFFICE.

JUSTUS I. MICHEL, OF FARMINGTON, WASHINGTON.

NUT LOCK.

Application filed June 12, 1922. Serial No. 567,696.

*To all whom it may concern:*

Be it known that I, JUSTUS I. MICHEL, a citizen of the United States, residing at Farmington, in the county of Whitman and State of Washington, have invented new and useful Improvements in Nut Locks, of which the following is a specification.

This invention relates to nut locks and has for its object the provision of a nut of novel formation designed to be engaged upon an ordinary bolt and so constructed as to lock the nut positively against unscrewing movement.

An important and more specific object is the provision of a nut of this character which is equipped with a pivoted spring pressed pawl which bitingly engages the thread of the bolt to prevent retrograde movement of the nut so that accidental unscrewing will be prevented.

An additional object is the provision of a nut lock which will be simple and inexpensive in manufacture, easy to apply and use, positive in action, durable in service and a general improvement in the art.

With the above and other objects and advantages in view the invention consists in the details of construction to be hereinafter more fully described and claimed and illustrated in the accompanying drawings, in which:

Figure 1:
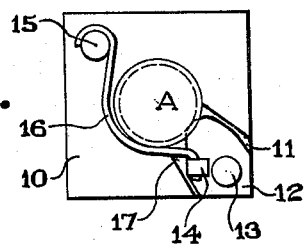
Figure 1 is an end view of my nut in applied position.
Figure 2:
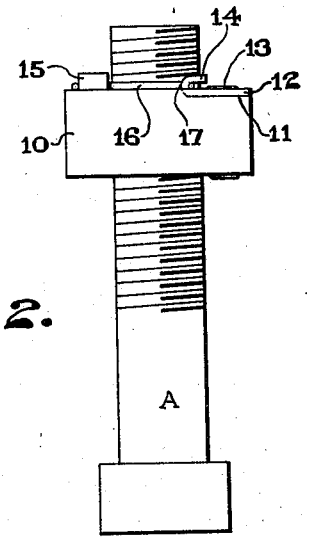
Figure 2 is a side view thereof.
Figure 3:
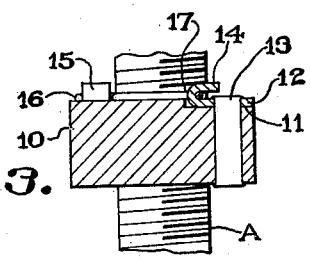
Figure 3 is a detail section taken through the pawl and showing the spring mounting.

Referring more particularly to the drawings the letter A designates a bolt to which my nut 10 is applied. In carrying out my invention I cut away one corner of the nut as shown at 11 and within which cut away portion is mounted a pawl 12 which is pivoted at 13. In actual practice the pivot consists of a pin which passes through the pawl and the nut and which has its ends upset. Formed integrally upon one edge of this pawl is a tongue 14 which is bent up and over as shown to define a hook. Located at the diagonally opposite corner of the nut is a pin 15 upon which is engaged one end of a spring 16 which has its other end hooked as shown at 17 for engagement with the hook 14.

Assuming that the device has been constructed as above described the nut is applied to the bolt and screwed down in the usual manner. When rotation in a clockwise direction occurs the pawl 12 will ride idly with respect to the threads on the bolt, so as not to interfere in any way with the screwing action. When, however, an attempt is made to unscrew the nut the pawl 12 will bitingly engage the threads on the bolt and thus positively prevent such retrograde movement. When necessary to remove the nut the spring 16 must be disengaged either from the hook 14 or the pin 15 whereupon the pawl will become idle and permit the unscrewing action.

From the foregoing description and a study of the drawings it will be apparent that I have thus provided a very simply constructed and consequently inexpensive self-locking nut which is capable of use in a wide variety of arts and which may be of manifest advantage as accidental loosening is positively prevented.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A lock nut comprising a nut body formed with a threaded bore adapted for engagement upon a bolt, the surface of the nut most remote from the head of the bolt having one corner formed with a recess, a pawl member located within said recess, a rivet passing through said pawl and through the nut body whereby the pawl will be movably mounted, the degree of movement being limited by the engagement of the edges of the pawl with the walls of the recess, an upstanding post projecting from the outer face of the nut at its corner diagonally opposite said rivet, a curved spring formed from a single piece of resilient wire having one end coiled about said post and having its intermediate portion extending about the bolt, and said pawl being formed with a tongue-like extension bent back upon itself to define a hook receiving the other end of said spring.

In testimony whereof I affix my signature.

JUSTUS I. MICHEL.